Aug. 11, 1964  A. M. VOUTSAS  3,143,891
ANGULAR ACCELEROMETER
Filed Nov. 6, 1961

INVENTOR.
ALEXANDER M. VOUTSAS
BY
ATTORNEY.

ANGULAR ACCELEROMETER

Alexander M. Voutsas, Schenectady, N.Y., assignor to American Bosch Arma Corporation, a corporation of New York
Filed Nov. 6, 1961, Ser. No. 150,335
6 Claims. (Cl. 73—517)

The present invention relates to accelerometers and has particular reference to devices for measuring angular acceleration.

Measurement of angular acceleration resolves into a measurement of the torque which must be applied to an inertia mass by a spring system so as to keep the mass at an angular displacement which is a function of the angular acceleration with respect to the accelerating body. The applied torque is normally effected through some type of resilient restraint means between the mass and the body, and the angular displacement for a given angular acceleration depends on the spring constant of the restraint means, and the moment of inertia of the mass about the axis about which the angular acceleration takes place. Thus, the angular acceleration of a body about an axis can be determined by the angle which exists between an inertia mass which is resiliently connected to the body and the body itself.

In the present invention, the angular displacement detector is a vibrating member (or a pair of members) whose natural frequency changes in accordance with the torsional stress applied thereto and may contribute to the resilient restraint between the mass and the body. The relative angular displacement of the casing of the accelerometer with respect to the inertia mass causes a torsional stress to be applied to the vibrating member, whence the angle of displacement is measured by the change in natural frequency of the vibrating member, or the difference in natural frequencies of a pair of oppositely affected vibrating members.

Figure 1:
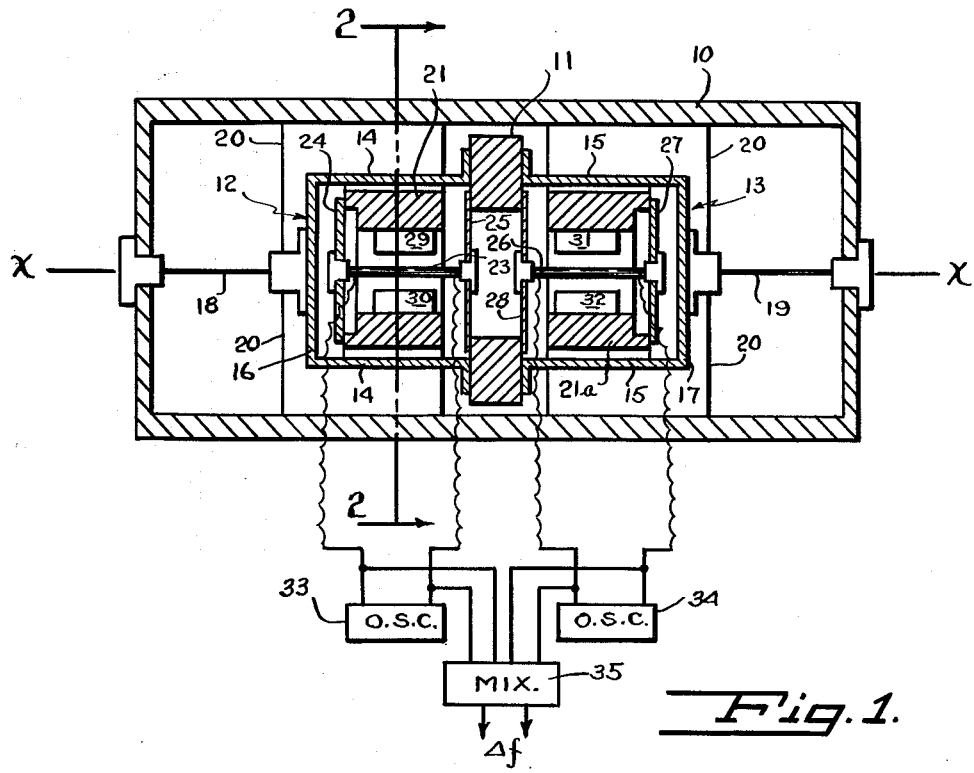
Figure 2:
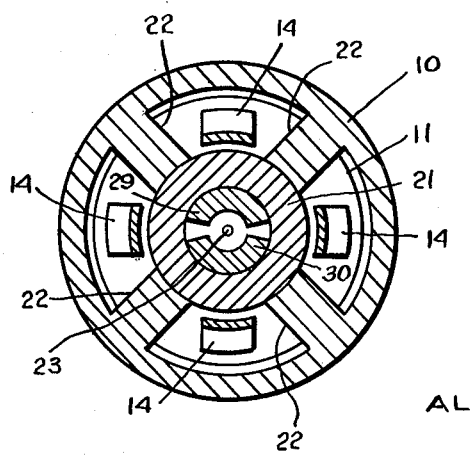

For a more complete understanding of the invention, reference may be had to the accompanying diagrams in which FIG. 1 shows a sectional view of a preferred configuration of the angular accelerometer taken along line 1—1 of FIG. 2.

FIG. 2 is a section along line 2—2 of FIG. 1.

In the preferred construction of FIGS. 1 and 2, the accelerometer casing or frame is identified by numeral 10 and the inertia mass by numeral 11. The inertia mass 11 is supported in the frame 10 by means of the spiders 12, 13, the four legs 14, 15 of which respectively are attached to the mass 11 and the central discs 16, 17 of which are suspended in the frame 10 by longitudinal torsion wires 18, 19 and radial cross suspension wires 20.

Supporting rings 21, 21a are positioned within the spiders 12, 13 and are held rigidly in the casing 10 by the projections 22 which intervene between the legs 14, 15. A thin tape 23 is stretched between diaphragms 24 and 25 which are held respectively on the stationary ring 21 and on the inertia mass 11 while a second thin tape 26 is stretched between diaphragms 27 and 28 which are held respectively in the stationary ring 21a and the inertia mass 11. The tape 23 is located in the transverse magnetic field of magnets 29, 30 which are attached to the inside of ring 21 while tape 26 is located in the transverse magnetic field of magnets 31, 32 which are similarly attached to ring 21a.

The tapes 23, 26 are made of electrically conducting material so that when electronic oscillators 33, 34 are electrically connected across the tapes 23 and 26, the tapes are maintained in vibration at their natural frequency as is now well known in the art.

It will be seen that in the configuration described the inertia mass 11 is restrained from longitudinal motion by the end torsion wires 19 and from transverse motion by cross supports 20 but is able to rotate about the axis through wires 19 through a limited angle. The restraint to rotational movement of mass 11 which is attributed to cross tapes 20 can be minimized by proper design of the means for attaching tapes 20 to spiders 12, 13.

When the frame 10 undergoes an angular acceleration about the $x$—$x$ axis it will be seen that the tapes 23, 26 will be twisted at the inertia mass 11 tends to remain stationary. The degree of twist is dependent upon the moment of inertia of the mass 11 and the spring constant of the restraints applied by suspension members 19, 20 and the tapes 23, 26, and upon the magnitude of the angular acceleration. The ends of the tapes 23 and 26 which are connected to the frame 10 are twisted in opposite directions to establish a pretwist in the tapes in the rest condition. During relative rotation between one mass 11 and the frame 10 the twist in one tape will increase and the twist in the other tape will decrease.

Since the change in resonant frequency of the tapes 23, 26 is a function of their twist, the change in the natural frequency of these members can be and is used as the measure of angular acceleration of frame 10.

The natural frequency of a twisted tape can be expressed as $$f_\theta = f_o \left[ 1 + K\left(1 - \frac{\sin\theta}{\theta} + \frac{\theta \sin\theta}{4\pi^2 - \theta^2}\right)\right]^{\frac{1}{2}} \quad (1)$$

where
$f_\theta$ = the natural frequency of a vibrating tape under tension with zero twist between the ends $\theta = 0$, $$f_o = K_1 \left[\frac{1}{L_m}\left(\frac{\pi^2 EI}{L^2} + T\right)\right]^{\frac{1}{2}}$$

$$K = \frac{I_2 - I_1}{\frac{L^2 T}{2\pi^2 E} + 2I_1}$$

$K_1$ = constant
$T$ = pretension of the tape
$E$ = tape modulus of elasticity
$L$ = tape length, and
$I_1$ and $I_2$ are moments of inertia of the tape cross section.

When the frame 10 undergoes angular acceleration about the axes $x$—$x$ the mass 11 lags behind frame 10 and the angular displacement of the mass 11 with respect to the frame 10 can be expressed as $$\phi = \Delta\theta = \frac{I_P}{K_S}\alpha \quad (2)$$

where $I_P$ = polar moment of inertia of the mass 11
$K_S$ = constant including the sum of the spring constants of all restraining members
$\alpha$ = angular acceleration The total twist angle of the tapes when the frame 10 is under angular acceleration is therefore equal to the sum of the pretwist angle $\theta_o$ and the angular displacement $\Delta\theta$ (which is positive in the case of one tape, e.g., 23 and is negative in the case of the other tape 26) so that the one tape is twisted by $\theta_o + \Delta\theta$ and the other tape is twisted by $\theta_o - \Delta_\theta$. Expressing the new constant frequency for a twist angle $(\theta_o + \Delta\theta) = \theta$ in a Taylor's expansion.

$$f_{(\theta_o + \Delta_\theta)} = f_{\theta_o} + \frac{df}{d\theta}\Delta\theta + \frac{1}{2}\frac{d^2f}{d\theta^2}\Delta\theta^2 + \frac{1}{6}\frac{d^3f}{d\theta^3}\Delta\theta^3 \ldots \quad (3)$$

where $\theta_o$ = a pretwist angle of tapes 23, 26
$\Delta\theta$ = change in twist due to angular acceleration Since the tape 23 is twisted through a total angle of $\theta_0+\Delta\theta$ the frequency of vibration of tape 23 is $$f_{23}=f_{\theta_0}+\frac{df}{d\theta}\Delta\theta+\frac{1}{2}\frac{d^2f}{d\theta^2}\Delta\theta^2+\frac{1}{6}\frac{d^3f}{d\theta^3}\Delta\theta^3 \ldots \quad (4)$$

Since the total angle of twist of tape 26 is $\theta_0-\Delta_\theta$, the frequency of vibration of tape 26 is $$f_{26}=f_{\theta_0}-\frac{df}{d\theta}\Delta\theta+\frac{1}{2}\frac{d^2f}{d\theta^2}\Delta\theta^2-\frac{1}{6}\frac{d^3f}{d\theta^3}\Delta\theta^3 \ldots \quad (5)$$

and the difference frequency is $$\Delta f=f_{23}-f_{26}=\frac{2df}{d\theta}\Delta\theta+\frac{1}{3}\frac{d^3f}{d\theta^3}\Delta\theta^3 \ldots \quad (6)$$

Substituting $$\frac{I_P}{K_S}\alpha \text{ for } \Delta\theta$$

Equation 6 can be written as $$\Delta f=\frac{2df}{d\theta}\frac{I_P}{K_S}\alpha+\frac{1}{3}\left(\frac{I_P}{K_S}\right)^3\frac{d^3f}{d\theta^3}\alpha^3 \ldots \quad (7)$$

or $$\Delta f=K_A\alpha+K_B\alpha^3 \ldots K_A\alpha\left[1+\frac{K_B}{K_A}\alpha^2 \ldots\right] \quad (8)$$

Conventional computing circuitry can be used to solve Equation 8 for $\alpha$ from the value of $\Delta f$ obtained from a mixer 35 to which the signals from oscillators 33 and 34 applied.

It will be seen that $$\frac{K_B}{K_A}$$

is equal to $$\frac{1}{6}\left(\frac{I_P}{K_S}\right)^2\left(\frac{d^3f}{d\theta^3}\right)\left(\frac{1}{\frac{df}{d\theta}}\right)$$

and by proper choice of $I_P$ and $K_S$ the non linear term $$\frac{K_B}{K_A}\alpha^2$$

can be made small compared to unity. $I_P$ of course is dependent upon the geometry of the mass 11 and $K_S$ can be adjusted by choosing the tension in supporting tapes 19, 20, if the sensitive tapes 23, 26 are to remain unchanged.

Many variations will occur to those skilled in the art. For example, the torsion-sensitive tapes 23, 26 may be anchored to the frame 10 directly. Although the isolating spring or diaphragms 24, 25, 27, 28 function to decrease the effect of minute dimensional changes due to temperature changes, mechanical creep, etc., they may not be necessary in all cases. The geometry of the inertia mass, too, is a matter of choice and it may be a solid disc or a dumbbell shaped article if desired, instead of the ring in FIGS. 1 and 2. Furthermore, the inertia mass may be supported by inclined cross supports 20 to eliminate the need for the end torsion wires 14. It will be recognized that the device may be used for detecting linear forces as well as angular accelerations by causing the linear forces to rotate the mass as by the use of a pendulous mass, for example, or other mechanical means to rotate the mass in response to external effects such as pressure changes caused by winds, sound waves, etc., for example.

I claim:

1. In an angular accelerometer, a frame, a mass supported in said frame for rotation about an axis with respect to said frame, a member connected between said mass and said frame and adapted to be twisted during relative displacement between said mass and said frame thereby to vary substantially the natural frequency of vibration of said member, means for maintaining said member in vibration at its natural frequency, and means responsive to vibration of said member to derive indications of changes in said natural frequency.

2. In an angular accelerometer, a frame, a mass supported in said frame for rotation about an axis, a member connected between said mass and said frame and adapted to be twisted during relative displacement between said mass and said frame, and means for maintaining said member in vibration at its natural frequency, and a second member connected between said mass and said frame and adapted to be twisted during relative displacement between said mass and said frame and means for maintaining said second member in vibration at its natural frequency, means for obtaining the difference between the natural frequencies of said first and second members.

3. In an angular accelerometer, a frame, a mass supported in said frame for rotation about an axis, a member connected between said mass and said frame and adapted to be twisted during relative displacement between said mass and said frame, and means for maintaining said member in vibration at its natural frequency, and a second member connected between said mass and said frame and adapted to be twisted during relative displacement between said mass and said frame and means for maintaining said second member in vibration at its natural frequency wherein the first and second members are pretwisted whereby the natural frequency of one member increases while the natural frequency of the other decreases during relative displacement between said mass and said frame.

4. In an angular accelerometer, a frame, a mass supported in said frame for rotation about an axis, a member connected between said mass and said frame and adapted to be twisted during relative displacement between said mass and said frame, and means for maintaining said member in vibration at its natural frequency, and a second member connected between said mass and said frame and adapted to be twisted during relative displacement between said mass and said frame and means for maintaining said second member in vibration at its natural frequency, means for obtaining the difference between the natural frequencies of said first and second members wherein the first and second members are pretwisted whereby the natural frequency of one member increases while the natural frequency of the other decreases during relative displacement between said mass and said frame.

5. In a device of the character described, a body supported for rotation about an axis, means restraining said body against lateral motion with respect to said axis, a torsionally-resilient member elongated parallel to said axis and having a mass small compared with that of said body, means for holding one end of said member fixed against rotation, means between said body and the other end of said member for twisting said member in response to a force on said body tending to rotate said body about said axis thereby to vary substantially the natural frequency of vibration of said member, and means for vibrating said member at its natural frequency.

6. In a device of the character described, a body supported for rotation about an axis, a pair of coaxially-aligned, elongated members, means for holding one end of each of said members fixed against rotation means between said body and the opposite end of each of said members for twisting said members in response to a force on said body tending to rotate said body about said axis thereby to vary substantially the natural frequency of vibration of said members, and means for vibrating each of said members at its natural frequency.

References Cited in the file of this patent
UNITED STATES PATENTS 2,753,173  Barnaby _____ July 3, 1956
2,968,950  Dunbar _____ Jan. 24, 1961